US010368397B2

(12) United States Patent
Heuzebroc et al.

(10) Patent No.: US 10,368,397 B2
(45) Date of Patent: Jul. 30, 2019

(54) HEATING DEVICE COMPRISING A LAMP REMOVABLY MOUNTED ON AN ASSOCIATED REFLECTOR (71) Applicant: SIDEL PARTICIPATIONS, Octeville-sur-Mer (FR)

(72) Inventors: Pierre Heuzebroc, Octeville-sur-Mer (FR); Jean-Francois Morisse, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/318,643

(22) PCT Filed: Jun. 12, 2015

(86) PCT No.: PCT/FR2015/051565
§ 371 (c)(1),
(2) Date: Dec. 13, 2016

(87) PCT Pub. No.: WO2015/193591
PCT Pub. Date: Dec. 23, 2015

(65) Prior Publication Data
US 2017/0135153 A1    May 11, 2017

(30) Foreign Application Priority Data
Jun. 18, 2014   (FR) ...................... 14 55595

(51) Int. Cl.
*H05B 3/42*   (2006.01)
*H05B 3/40*   (2006.01)
(Continued)

(52) U.S. Cl.
CPC ........... *H05B 3/0057* (2013.01); *B29C 49/06* (2013.01); *B29C 49/6427* (2013.01);
(Continued)

(58) Field of Classification Search
CPC .......... H05B 3/003–3/0076; H05B 3/40–3/42; H05B 31/0042–31/00543
(Continued)

(56) References Cited

U.S. PATENT DOCUMENTS 3,723,945 A * 3/1973 Detch ................... F21V 19/008
                                              362/217.08
5,968,397 A * 10/1999 Wyland ................... H01J 61/52
                                              219/405
(Continued)

FOREIGN PATENT DOCUMENTS

DE   20 2005 020 252 U1   2/2007
WO         01/62463 A1    8/2001
WO      2015/000875 A1    1/2015

OTHER PUBLICATIONS

English translation of WO2007079798 to Finger, published Jul. 2007.*
International Search Report, dated Sep. 8, 2015, from corresponding PCT Application.

*Primary Examiner* — Michael A Laflame, Jr.
(74) *Attorney, Agent, or Firm* — Young & Thompson (57) ABSTRACT

A heating device (14) includes: a tubular lamp (16) having two free end sections (32); at least one reflector (34) that extends longitudinally at a predefined transverse distance (D) from the lamp (16); two holding members (46) for holding the lamp (16) in a transverse position relative to the reflector (34), each holding member (46) being attached to the reflector (34); characterized in that each free end section (32) of the lamp (16) is removably mounted on each holding member (46) by reversibly interlocking a portion of the free end section (32) of the lamp with a housing (54) of complementary shape in a direction orthogonal to the longitudinal direction.

13 Claims, 5 Drawing Sheets

(51) Int. Cl.
  *H05B 3/00* (2006.01)
  *B29C 49/06* (2006.01)
  *B29C 49/68* (2006.01)
  *B29C 49/64* (2006.01)
  *B29K 101/12* (2006.01)

(52) U.S. Cl.
  CPC .......... *B29C 49/68* (2013.01); *B29C 49/6418* (2013.01); *B29K 2101/12* (2013.01)

(58) Field of Classification Search
  USPC ................. 392/407, 411–415, 422–431; 362/217.1–217.17, 285
  See application file for complete search history.

(56) References Cited

U.S. PATENT DOCUMENTS

| | | | |
|---|---|---|---|
| 6,905,230 B2 * | 6/2005 | Schmitkons | F21V 19/008 250/492.1 |
| 7,465,063 B2 * | 12/2008 | Stillman | F21L 14/026 362/219 |
| 8,596,851 B2 * | 12/2013 | Ko | G02F 1/133608 362/260 |
| 9,050,831 B2 * | 6/2015 | Rae | F21V 19/008 |
| 2006/0279957 A1 * | 12/2006 | Kwon | G02F 1/133604 362/378 |
| 2008/0068835 A1 * | 3/2008 | Ahn | F21V 19/009 362/225 |
| 2016/0167258 A1 | 6/2016 | Heuzebroc et al. | |

* cited by examiner

HEATING DEVICE COMPRISING A LAMP REMOVABLY MOUNTED ON AN ASSOCIATED REFLECTOR

TECHNICAL FIELD OF THE INVENTION

The invention relates to a heating device, particularly for heating preforms made of thermoplastic material, having a lamp and a reflector that is assembled with the lamp.

TECHNICAL BACKGROUND OF THE INVENTION

The invention relates more particularly to a heating device, particularly for heating preforms made of thermoplastic material, having:
- a lamp having a tubular bulb, the lamp having two free end segments, each of which has an end stem of the bulb and an end base that is secured to the stem;
- at least one reflector that extends longitudinally at a set transverse distance from the tubular bulb;
- two elements for holding the lamp in transverse position relative to the reflector, each holding element being secured to the reflector.

It is known to manufacture containers made of thermoplastic material by forming preforms, for example by blow molding or by stretch blow molding. To perform the forming operation, it is necessary to heat in advance the body of the preforms to a glass transition temperature to make it malleable. The installations for mass production of containers have for this purpose stations for heating the preforms.

A heating station generally has the shape of a tunnel in which at least one of the walls is formed by an assembly of several heating modules equipped with heating devices of the type described previously. The preforms advance along the tunnel in front of the heating modules while rotating around themselves so that their bodies are heated uniformly to a temperature suitable for the forming operation.

The lamps used for the heating of the preforms are generally halogen-type lamps that emit a heating electromagnetic radiation, for example an infrared radiation. They have a bulb of which a tubular part encloses a filament that extends longitudinally between two bases. Each base makes possible the supply of electricity to the filament. When it is supplied with adequate electrical power, the filament emits the heating radiation radially in all directions.

Such a tube-shaped lamp diffuses the heating electromagnetic radiation in all directions. Thus, a portion of the radiation is not directed toward the preform. Consequently, to heat a preform, a portion of the electrical energy is consumed by the lamp to no purpose.

To make possible a substantial savings in energy, it is known to arrange a reflector near the tubular bulb to send the light radiation back toward the preform. Such a reflector is made of a material that is resistant to the high heat produced by the lamp, for example made of ceramic.

Currently, the reflectors are permanently secured to the lamp. Consequently, in the event the lamp fails, the entire heating device formed by the lamp and the reflector must be replaced.

BRIEF SUMMARY OF THE INVENTION

The invention proposes a heating device of the type described previously, characterized in that each free end segment of the lamp previously equipped with its base is mounted in a removable way on each holding element by reversible interlocking of a portion of the free end segment of the lamp with a housing with a complementary shape in a direction that is orthogonal to the longitudinal direction.

Such a heating device very advantageously makes it possible to preserve the reflector to assemble it with a spare lamp in the event the first lamp fails. Such a solution makes it possible to save the purchase of a new reflector, while avoiding needlessly producing waste material.

According to other characteristics of the heating device made according to the teachings of the invention:
- each holding element has a slot that is transversely open toward the front that is intended to receive by transverse interlocking the complementary part of the free end segment of the lamp to hold the lamp in position relative to the reflector;
- the heating device has an end-stop of the lamp at the set transverse distance from the reflector;
- the slot is delimited by two elastically deformable lugs between which the complementary part of the end segment of the lamp is received with a vertical play for holding the lamp in the interlocked position;
- each holding element is formed by an independent part that is secured to the reflector, particularly by welding;
- each holding element is produced in a single piece with a support element of the reflector;
- the part to be interlocked of the end segment of the lamp is formed by the stem;
- the part to be interlocked of the end segment of the lamp is formed by the base;
- each end segment of the lamp is intended to be received sliding transversely with vertical play in a groove associated with a heating module, the device having at least one stabilizing element to prevent the rotation of the heating device around a longitudinal axis in relation to said groove by contact with a face of the groove;
- the stabilizing element has a contact tab with an upper face of the groove;
- the stabilizing element is formed by an independent element that is secured with the holding element, for example by welding;
- the independent element having the holding element is equipped with an end-stop of the lamp.

BRIEF DESCRIPTION OF THE FIGURES

Other characteristics and advantages of the invention will appear during the reading of the following detailed description for the understanding of which reference will be made to the accompanying drawings in which.

DETAILED DESCRIPTION OF THE FIGURES

In the description below, elements having an identical structure or similar functions will be designated by the same references.

In the description below, longitudinal, vertical and transverse orientations indicated by the trihedron "L, V, T" of the figures will be adopted in a nonlimiting way. The transverse direction is directed here from back to front.

In the description below, the term "interior" will be used to define a face turned longitudinally in the direction of the bulb 18, and the term "exterior" will be used to define a face turned in the opposite direction.

Figure 1:
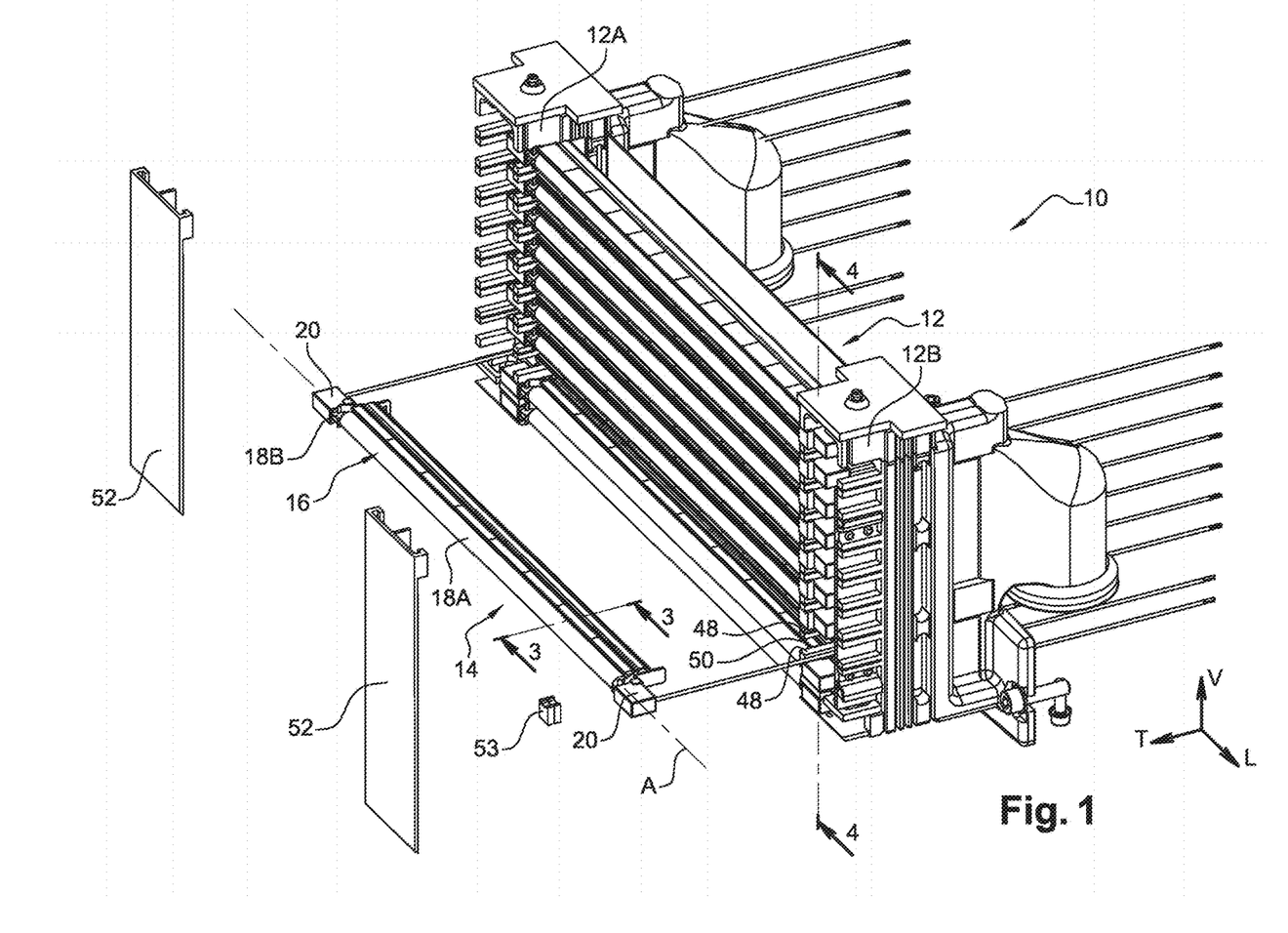
FIG. 1 is a perspective view that shows a heating module equipped with a plurality of heating devices made according to the teachings of the invention, one of the heating devices being shown disassembled.

Shown in FIG. 1 is a heating module 10 that is intended to equip a station (not shown) for heating preforms. The heating module 10 has a rack 12 for support of several identical heating devices 14.

Figure 2:
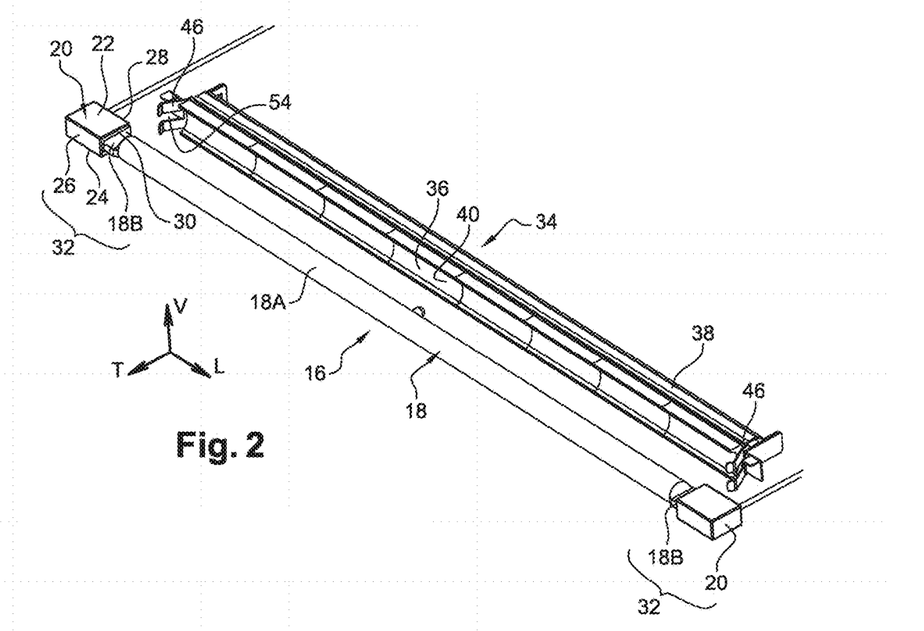
FIG. 2 is an exploded perspective view that shows a heating device before interlocking of the lamp with the associated reflector.

As shown in FIG. 2, each heating device 14 has a lamp 16. The lamp 16 has a tubular bulb 18 with a longitudinal axis "A." The bulb 18 has a hollow tubular central segment 18A that is hermetically sealed at its two longitudinal ends by two stems 18B. The two stems 18B are flattened in a transverse longitudinal plane.

The hollow tubular segment 18A encloses means (not shown) for emitting an electromagnetic radiation that can heat the thermoplastic material that constitutes the preform, for example an infrared radiation. It is, for example, a longitudinal filament that extends between the two stems 18B and that is immersed in an atmosphere that is suitable for emitting heating radiation. With reference to a halogen-type lamp, the atmosphere contains a halogen gas.

The bulb 18 is made of a material that is transparent and heat-resistant, for example made of quartz glass.

The lamp 16 also has two bases 20, each of which is secured to an associated stem 18B. Each base 20 has a parallelepiped case that has an upper horizontal face 22, a lower horizontal face 24, a front longitudinal vertical face 26, a rear longitudinal vertical face 28. Each base 20 also has a transverse vertical face 30, a so-called interior face 30, which is turned toward the bulb 18 and which has a passage opening for the free end of the associated stem 18B.

Each base 20 encloses means (not shown) to control the supply of electricity of the filament. Each base 20 is secured in a non-removable way on the stem 18B that is associated with the bulb 18, for example by means of adhesive.

Thus, the lamp 16 has two free end segments 32, each of which has an end stem 18B of the bulb and the base 20 secured to said stem 18B.

Figure 3:
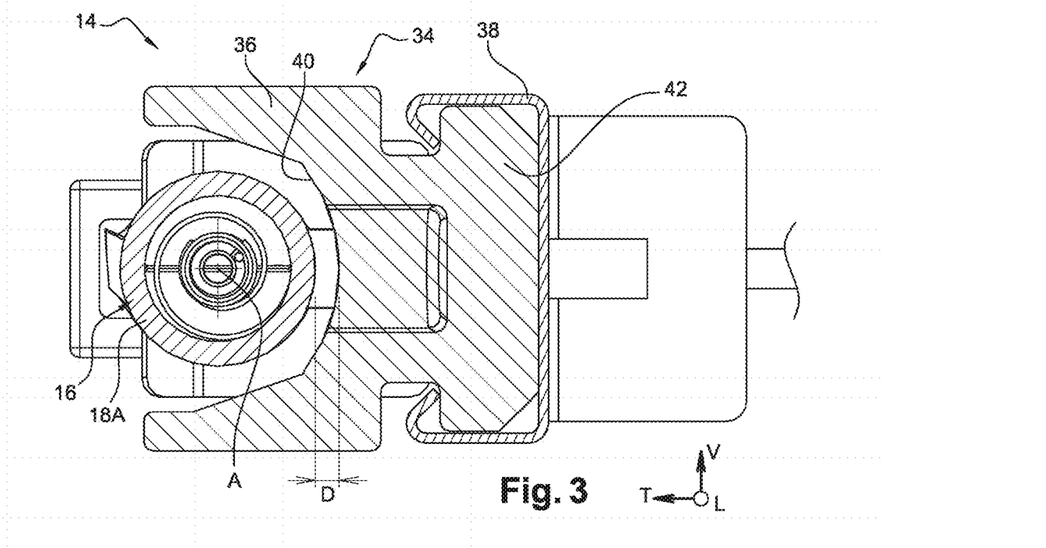
FIG. 3 is a cutaway view along the cutting plane 3-3 of FIG. 1 that shows a lamp interlocked with its reflector.

Each heating device 14 also has a longitudinal reflector 34 that is arranged transversely opposite a rear face of the tubular segment 18A of the bulb 18. As shown in FIG. 3, when it is assembled with the lamp 16, the reflector 34 is arranged at a set transverse distance "D" from the tubular segment 18A.

The reflector 34 here is formed of a plurality of similar blocks 36 that are carried by a support element formed by a longitudinal support track 38. Each block 36 has a front concave cylindrical face 40 for reflecting the electromagnetic radiation that the tubular segment 18A of the lamp 18 accommodates. Each block 36 further has a rear portion that forms a slide 42 that is received by longitudinal sliding in the track 38.

The track 38 here is made by shaping a metal sheet that has in cross-section an open "C" shape transversely toward the front.

Figure 7:
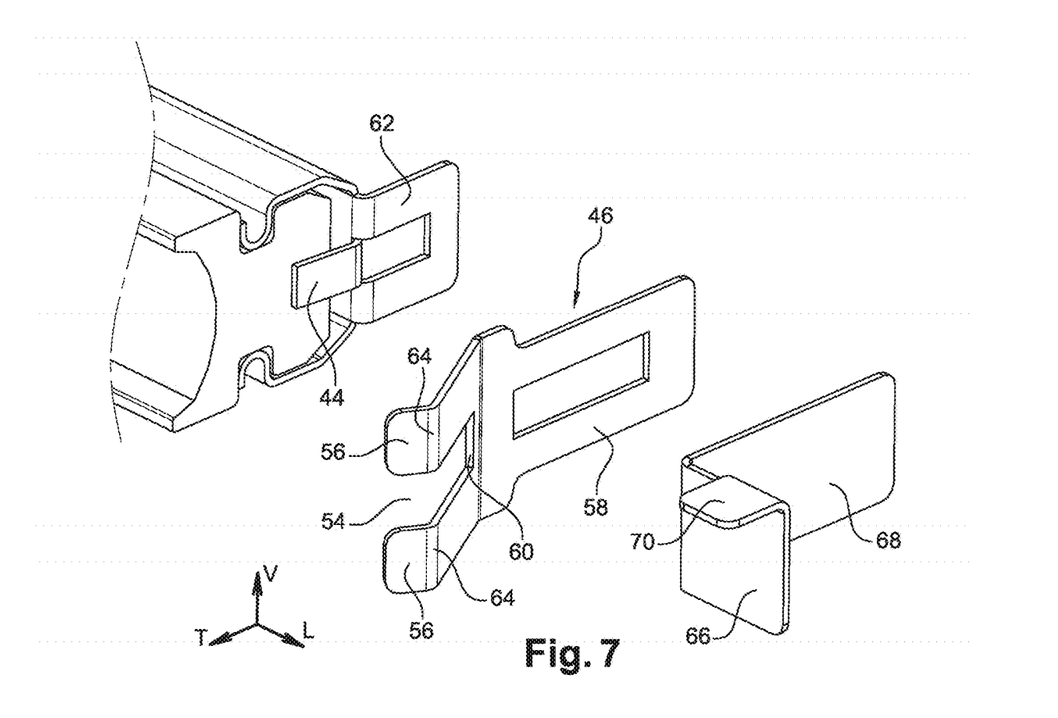
FIG. 7 is an exploded view of the reflector of FIG. 5 that shows the holding element of the lamp and the stabilizing element of the heating device.

The blocks 36 are slid in a longitudinal line into the track 38 so that their front faces 40 form a single reflecting face of the same length as the tubular segment 18A of the bulb 18. As is shown in FIG. 7, the blocks 36 are immobilized longitudinally by two transverse retaining tabs 44, each of which extends transversely toward the front through the track 38.

The track 38 is made of, for example, stainless steel, while the blocks 36 are made of ceramic. Each retaining tab 44 here is formed of material with the track 38, for example by cutting and bending.

The heating device 14 is intended to be formed by the assembly of the lamp 16 with the reflector 34 to form an integral unit. For this purpose, two elements 46 for holding the lamp 16 in transverse position in relation to the reflector 34 are each secured to a longitudinal end associated with the reflector 34. These holding elements 46 make it possible to position correctly the reflecting face 40 of the reflector 34 at the set distance "D" from the tubular segment 18A of the bulb 18.

Furthermore, these holding elements 46 make it possible to hold the lamp 16 in position longitudinally in relation to the reflector 34 so that the reflecting face 40 is opposite the entire tubular segment 18A of the bulb 18.

The holding elements 46 will be described in more detail below.

The heating devices 14 thus assembled are arranged in the support rack 12 above one another, as is shown in FIG. 1. For this purpose, the rack 12 has two columns 12A, 12B arranged longitudinally on either side of the space intended to receive the tubular segments 18A of the lamps 16.

Figures 4, 5:
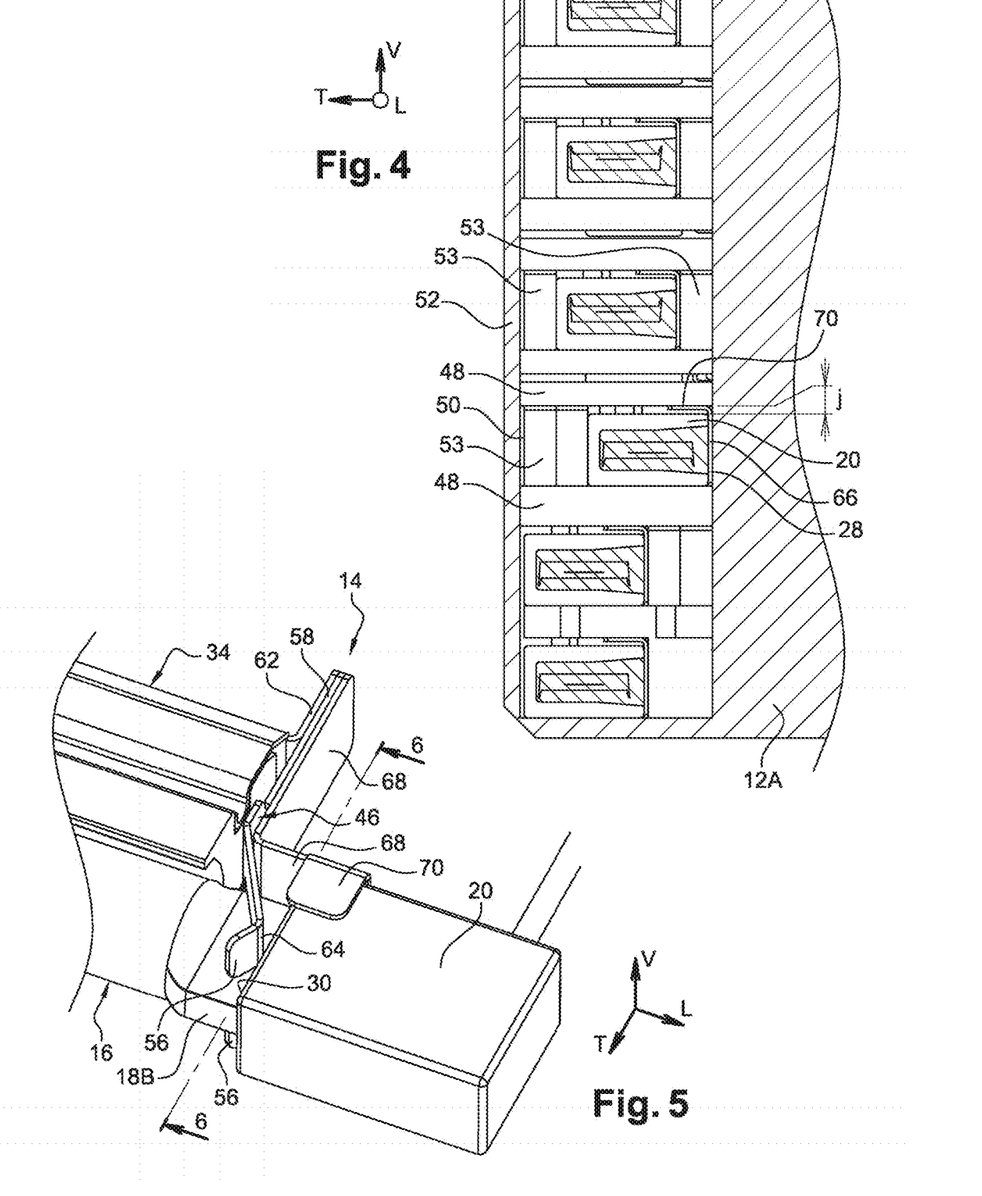
FIG. 4 is a cutaway view along the cutting plane 4-4 of FIG. 1 that shows a support rack of the heating devices.
FIG. 5 is a detail view on a larger scale of a heating device of FIG. 1 that shows an end segment of the heating device when the lamp is interlocked with the reflector.

As illustrated in greater detail in FIG. 4, each column 12A, 12B exhibits a rake shape equipped with transverse teeth 48 that extend forward from the associated column 12A, 12B. Two adjacent teeth 48 vertically define a transverse groove 50 that is open toward the front that is intended to receive a base 20 associated with a lamp 16 by transverse sliding. Each base 20 is received with a vertical play "j" in the associated groove 50. Each rake 12A, 12B has a longitudinal width that is less than the longitudinal length of a base 20.

Each heating device 16 is thus carried by a lower tooth 48 of the groove 50. The heating devices 16 are then transversely held in their grooves 50 by two transverse vertical hoods 52 that are each secured against a column 12A, 12B to close the grooves 50 transversely toward the front.

Each groove 50 further has a transverse depth that is greater than the transverse width of a base 20 to make it possible to adjust the transverse position of each heating device 16 in relation to the preforms. For this purpose, the heating devices 16 are immobilized transversely by spacers 53 that are inserted between the base 20 and the bottom of the groove 50 and/or the hood 52.

Sometimes a lamp 16 stops working, for example because of a "breakdown" of the filament. It is then necessary to replace this lamp 16. To make it possible to preserve the reflector 34 by replacing only the lamp 16, the lamp 16 is assembled with a reflector 34 in a removable manner. The disassembly of the lamp 16 does not necessitate taking off the bases 20 of the lamp 16.

According to the teachings of the invention, each free end segment 32 of the lamp 16 previously equipped with its base 20 is mounted on each holding element 46 by reversible interlocking of a portion of the free end segment 32 of the lamp 16 with a housing 54 with a complementary shape in a direction that is orthogonal to the longitudinal direction "L."

Figure 6:
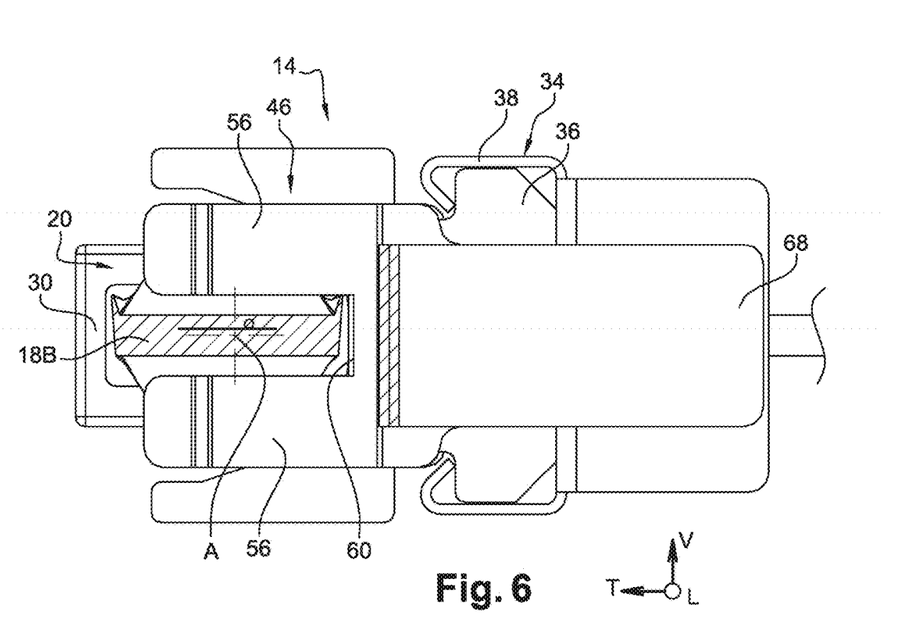
FIG. 6 is a transverse cutaway view along the cutting plane 6-6 of FIG. 5 that shows the holding element of the lamp interlocked with a stem of the lamp.

According to a first embodiment of the invention that is shown in FIGS. 5 to 7, the lamp 16 is mounted on each holding element 46 by reversible interlocking of the stems 18B with a support slot 54 for each holding element 46 in a transverse direction, from front to back.

Since the two holding elements 46 are identical, a single one of them will be described below, the description being applicable by symmetry to the other holding elment.

As illustrated in FIG. 7, the holding element 46 has an upper lug 56 and a lower lug 56 that are parallel and that extend transversely toward the front from a rear base 58. The two lugs 56 extend in the same vertical plane. The lugs 56 vertically delimit the slot 54. The slot 54 is thus open transversely toward the front, while it is delimited transversely toward the rear by a bottom 60 formed by a vertical edge of the base 58.

The base 58 and the lugs 56 are formed in a single piece, for example by cutting and bending of a transverse vertical metal sheet.

The rear base 58 forms a plate that extends in a vertical transverse plane. The holding element 46 is intended to be secured on the reflector 34 by welding of the base 58 against a vertical support tab 62 that extends transversely toward the rear from a longitudinal end edge of the track 38. When the holding element 46 is secured to the reflector 34, the lugs project transversely toward the front in relation to the reflecting face 40 of the blocks 36 so as to make possible the interlocking of the stems 18B.

Thus, in this embodiment of the invention, each holding element 46 is formed by an independent part that is secured to the reflector, particularly by welding.

In a variant, not shown, of the invention, each holding element is produced in a single piece with a component of the reflector.

In the embodiment shown in the figures, the track 38, the retaining tabs 44 and the support tabs 62 are made in a single piece. For example, the support tabs 62 are made by folding the longitudinal ends of the sheet that forms a rear wall of the track 38. The retaining tabs 44 are made by cutting and folding a central portion of the support tabs 62 in the other direction.

The lugs 56 of the holding element 46 are advantageously elastically deformable in horizontal bending, and the slot 54 is sized to receive the stem 18B of the bulb 18 with a rather large vertical holding play to make possible the sliding of the stem 18B into the slot 54, but small enough so that the stem 18B is held in position by wedging against the edges of the slot 54 when the lamp 16 is left free in the slot 54. In other words, the holding play makes possible an imperceptible pivoting of the lamp 16 around its longitudinal axis so that the stem 18B is in simultaneous contact with the two opposite edges of the slot 54, thus causing a transverse locking of the lamp 16 in the slot 54. The disassembly of the lamp 16 by uncoupling obliges the operator in charge to direct the stems 18B in a transverse plane by causing the lamp 16 to pivot slightly around its longitudinal axis so that the stem 18B is no longer wedged by the edges of the slot 54.

When the lamp 16 is thus interlocked with the holding element 46, it is held in position relative to the reflector 34:

transversely by wedging of the stem 18B between the lugs 56;

and vertically by contact with the lugs 56.

Further, as shown in FIG. 5, the lugs 56 are bent so as to have an elbow 64 that projects toward the exterior in the direction of the interior face 30 of the associated base 20. The elbows 64 of the two opposite holding elements 46 are intended to come into contact with their associated base 20 to center the lamp 16 longitudinally in relation to the reflector 34 by elastic bending of the lugs 56.

A stop 66 is also arranged on the holding element 46 to stop the sliding of the lamp 16 in the slot 54 at the set transverse distance "D" from the reflector 34.

The stop 66 is formed here by the front face of a vertical wing that extends longitudinally in projection toward the exterior from the base 58 of the holding element 46. This stop 66 is intended to come into contact with the rear face 28 of the associated base 20 when the stem 18B of the lamp 16 is inserted into the slot 54 of the holding element 46.

In the example shown in FIGS. 5 to 7, the stop 66 is formed by an independent element that is secured, for example by welding, against the base 58 of the holding element 46. For this purpose, a vertical attachment wing 68 extends transversely toward the rear from an internal edge of the stop 66. The wing 68 and the stop 66 are advantageously produced in a single piece by folding a metal sheet, thus forming a right angle.

As shown in FIG. 6, the bottom 60 of the slot 54 of the holding element 46 is arranged transversely at a distance of the stem 18B from the stop 66 when the base 20 is pressed against the stop so that the stem 18B of the lamp 16 does not strike against the bottom 60. This makes it possible to prevent the stem 18B from being wedged at the bottom 60 of the slot 54, particularly when the stem 18B is particularly thick because of the production tolerances of the bulb 18.

In a variant, not shown, of the invention, the bottom of the slot forms the stop for transverse positioning of the lamp in relation to the reflector.

Furthermore, as illustrated in FIG. 4, when the heating device 14 is arranged in the rack 12, it is supported only by vertical resting of the bases 20 on the lower teeth 48. Now, the reflector 34 that is secured in a removable way on the lamp 16 moves the center of gravity of the heating device 14 transversely toward the rear relative to the bases 20. Since the bases 20 are received with a vertical play "j" in the grooves 50, the heating device 14 has a tendency to rock toward the rear around a longitudinal axis. To prevent this rocking, the heating device 14 has at least one stabilizing element 70 to prevent the rocking of the heating device 14 in relation to the rack 12 of the heating module 10.

The stabilizing element 70 is formed here by a horizontal tab that extends transversely toward the front from an upper edge of the stop 66. The stabilizing element 70 thus extends above the upper face 22 of the associated base 20 at a vertical distance that is sufficient to reduce appreciably the vertical play of the base 20 in the groove 50. Nevertheless, sufficient operating vertical play remains to allow the sliding of the heating device 14 in the associated groove 50.

The stabilizing element 70 thus forms a contact tab with the tooth 48 that delimits the groove 50 on the top to prevent the rocking toward the rear of the heating device 14.

The stabilizing element 70 is produced here in a single piece with the stop 66, for example by folding of a metal sheet.

During the manufacture of the reflector 34, the blocks 36 are first of all longitudinally slid into the track 38 by means of their slide 42. Then, the retaining tabs 44 are retracted by folding through the longitudinal end openings to hold the blocks 36.

Then, the holding element 46 is secured, for example by welding, against the support tabs 62 that are previously retracted toward the rear by folding.

The independent element carrying the stop 66 and the stabilizing element 70 is secured, for example by welding, against the base 58 of the holding element 46, before, during or after the securing of the holding element 46 on the reflector 34.

The reflector 34, the holding element 46, the stop 66 and the stabilizing element 70 thus form an integral assembly that cannot be removed.

The lamp 16 is then positioned on the reflector 34. It will be understood that the lamp 16 is considered as a whole fitted previously to its assembly with the reflector 34. The various components of the lamp 16, particularly the bases 20, have been fitted, and here permanently secured on the bulb 18, before the positioning of the lamp 16 on the reflector 34.

The lamp 16 is arranged transversely in front of the reflector 34 so that the stems 18B are lined up with the front opening of the slots 54 of the holding elements 46. Then, the lamp 16 is moved transversely toward the rear so that the stems 18B are interlocked in the corresponding slots 54. The movement continues until the rear face 28 of the bases 20 is in contact against their associated stop 66.

The lamp 16 is thus positioned to form, with the reflector 34, an integral but removable unit forming the heating device 14. In other words, the lamp 16 is immobilized in relation to the reflector 34. The lamp 16 is held in position in relation to the reflector 34 by wedging between the lugs 56. This makes it possible to prevent the heating device 14 from becoming uncoupled before or during its insertion into the rack 12.

The heating device 14 thus forming an integral unit is then inserted transversely into the corresponding grooves 50 of the rack 12, optionally with the adapted spacers 53. The stabilizing element 70 is then in contact with the upper tooth 48 to prevent the rocking rearward of the heating device 14.

In the event of a malfunction of the lamp 16, it is enough to disengage from the reflector 34 by pulling on the lamp 16 to uncouple the stems 18B from the holding elements 46. The uncoupling of the lamp 16 is performed manually by an operator. Thanks to the slots 54, the disassembly of the lamp 16 does not require separating the bases 20 from the bulb 18.

This operation is advantageously performed while leaving the reflector 34 in place in the rack 12.

In a variant, the entire heating device 14 is removed from the rack 12 before proceeding with the disassembly of the lamp 16.

A new lamp 16 that is identical to the preceding one can then be positioned on the reflector 34 according to the method previously described.

Figure 8:
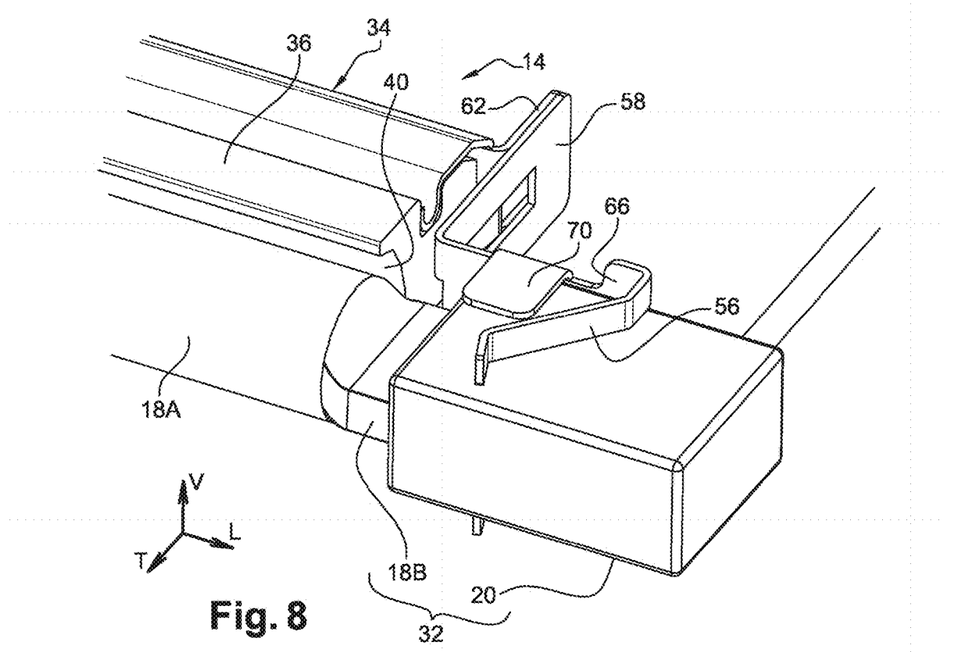
FIG. 8 is a view similar to that of FIG. 5 that shows a variant embodiment of the invention in which the lamp is held on the reflector by interlocking of the base with the holding element.
Figure 9:
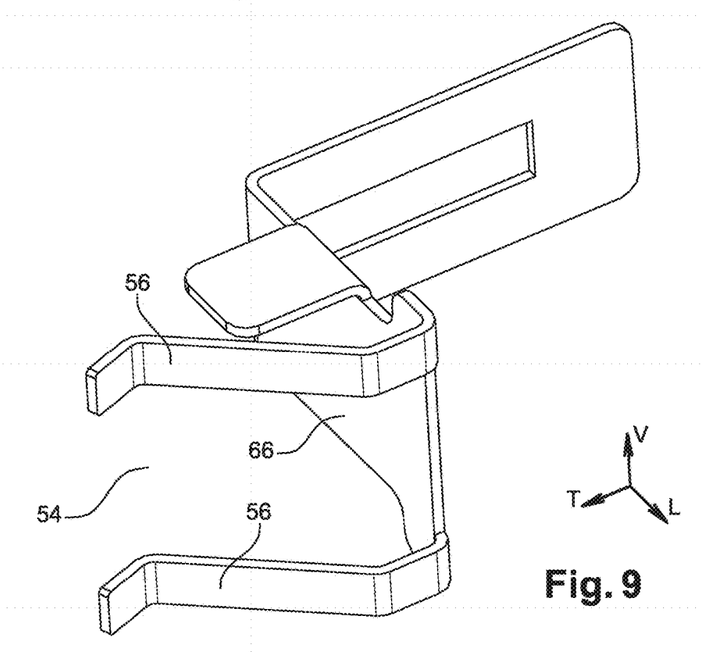
FIG. 9 is a detail view that shows the holding element of FIG. 8.

According to a second embodiment of the invention that is shown in FIGS. 8 and 9, the part to be interlocked of the end segment 32 of the lamp is no longer formed by the stem 18B but by the base 20.

In this case, the lugs 56 and the slot 54 are arranged longitudinally on the external side of the wing carrying the stop 66. This advantageously makes it possible to make the holding element 46, the stop 66, the stabilizing element 70 and the base 58 in a single piece, for example by cutting and folding a metal sheet.

The wing carrying the stop 66 then extends longitudinally from the base 58 of the holding element 46 to form a right angle.

Such a design makes it possible to obtain the same functions as that of the first embodiment. The interlocking that can be disassembled is always performed in a transverse direction.

It will be noted, nevertheless, that the lugs 56 occupy a more considerable vertical footprint than in the first embodiment.

The heating device 14 made according to the teachings of the invention advantageously makes it possible to reuse the reflector 34 with several lamps 16. This is especially advantageous since the reflector wears out considerably less quickly than a lamp 16.

The invention claimed is:

1. A heating device configured to heat preforms made of thermoplastic material, the heating device comprising:
   a subassembly including a lamp having a tubular bulb and two free end segments, each of the two free end segments having an end stem of the bulb and an end base that is secured to the end stem;
   at least one reflector that extends longitudinally at a set distance from the tubular bulb in a transverse direction, the reflector having a front face having a concave cross-section and configured to reflect electromagnetic radiation; and
   two holding elements configured to hold the lamp in a transverse position relative to the reflector, each holding element being secured to the reflector, each of the two holding elements having an end-stop and being rigid with respect to the transverse direction, such that the transverse distance between each of the end-stops and the reflector is constant and defines the set distance,
   wherein the subassembly is mounted in a removable way on each holding element by reversible interlocking of a portion of each respective one of the free end segments of the lamp with a housing of one of the holding elements, the housing having a complementary shape with respect to the portion of the respective free end segment, the reversible interlocking being in a direction that is orthogonal to the longitudinal direction, and
   the subassembly having a complementary stop surface configured to contact the end-stop of the holding element to position the subassembly with respect to the reflector.

2. The device according to claim 1, wherein each holding element has a slot that is transversely open toward the front that is configured to receive by transverse interlocking the complementary part of the free end segment of the lamp to hold the lamp in position relative to the reflector.

3. The device according to claim 2, wherein the slot is delimited by two elastically deformable lugs between which the complementary part of the end segment of the lamp is received with a vertical play to hold the lamp in an interlocked position.

4. The device according to claim 1, wherein each holding element is formed by an independent part that is secured to the reflector by welding.

5. The device according to claim 1, wherein each holding element is produced in a single piece with a support element of the reflector.

6. The device according to claim 1, wherein the part to be interlocked of the end segment of the lamp is formed by the stem.

7. The device according to claim 1, wherein the part to be interlocked of the end segment of the lamp is formed by the base.

8. The device according to claim 1, wherein each end segment of the lamp is configured to be received sliding transversely with vertical play in a groove associated with a heating module, and
the device further comprising at least one stabilizing element to prevent the rotation of the heating device around a longitudinal axis in relation to said groove by contact with a face of the groove.

9. The device according to claim 8, wherein the stabilizing element has a contact tab with an upper face of the groove.

10. The device according to claim 8, wherein the stabilizing element is formed by an independent element that is secured with the holding element by welding.

11. The device according to claim 10, wherein the independent element having the holding element is equipped with the end-stop.

12. The device according to claim 1, wherein each holding element has a slot defined therethrough and is configured to receive a respective stem by sliding of the stem into the slot, the stem being wedged against opposite edges of the slot to cause transverse locking of the lamp in the slot.

13. A heating module configured to heat preforms made of thermoplastic material, the heating module comprising:
a series of heating devices; and
a series of pairs of positioning grooves, each heating device being associated with one of the pairs of positioning grooves,
each of the heating devices comprising:
an emitting subassembly including a lamp having a tubular bulb and two free end segments, each of the two free end segments having an end stem of the tubular bulb and an end base that is secured to the end stem, each of the two free end segments having an attachment portion, each of the free end segments comprising a positioning portion configured to cooperate with one of the positioning grooves of the heating module,
a reflecting subassembly including at least one reflector that extends longitudinally, and two holding elements, each of the holding elements being secured to the reflector and having a housing configured for reversible interlocking with an attachment portion of each respective one of the free end segments to define a set transverse distance from the tubular bulb,
wherein the heating module has an assembled configuration in which each reflector is mechanically attached with the one positioning groove of the heating module only through the two corresponding positioning portions of the free end segments of the emitting subassembly, whereby the heating device forms an integral unit when the reflecting subassembly is mounted in a removable way on the emitting subassembly.

* * * * *